US011486473B2

United States Patent
Cobb et al.

(10) Patent No.: US 11,486,473 B2
(45) Date of Patent: Nov. 1, 2022

(54) VARIABLE FORCE TENSIONER ARM WITH CAP DISK SPRING

(71) Applicant: BorgWarner Inc., Auburn Hills, MI (US)

(72) Inventors: Keith B. Cobb, Cortland, NY (US); Sean Simmons, Ithaca, NY (US); Kevin Todd, Freeville, NY (US)

(73) Assignee: BorgWarner Inc., Auburn Hills, MI (US)

( * ) Notice: Subject to any disclaimer, the term of this patent is extended or adjusted under 35 U.S.C. 154(b) by 155 days.

(21) Appl. No.: 16/959,291

(22) PCT Filed: Jan. 31, 2018

(86) PCT No.: PCT/US2018/016096
§ 371 (c)(1),
(2) Date: Jun. 30, 2020

(87) PCT Pub. No.: WO2019/152001
PCT Pub. Date: Aug. 8, 2019

(65) Prior Publication Data
US 2021/0054912 A1 Feb. 25, 2021

(51) Int. Cl.
*F16H 7/08* (2006.01)
*F16H 7/18* (2006.01)

(52) U.S. Cl.
CPC ............ *F16H 7/08* (2013.01); *F16H 7/0848* (2013.01); *F16H 7/18* (2013.01);
(Continued)

(58) Field of Classification Search
CPC .............. F16H 7/08; F16H 2007/0802; F16H 2007/0804; F16H 2007/0806;
(Continued)

(56) References Cited

U.S. PATENT DOCUMENTS 2,191,946 A * 2/1940 Weller ................... F16H 7/0848
474/111
3,574,418 A 4/1971 Okabe
(Continued)

FOREIGN PATENT DOCUMENTS

DE 2008472 2/1970
DE 20202663 U1 2/2003
(Continued)

OTHER PUBLICATIONS

Extended European International Search Report for PCT/US2010/048055; dated Feb. 21, 2013; 6 pages.
(Continued)

*Primary Examiner* — Michael R Mansen
*Assistant Examiner* — Raveen J Dias
(74) *Attorney, Agent, or Firm* — Brown & Michaels, PC

(57) ABSTRACT

A stack of disk springs are placed between a second piston of a dual hydraulic variable force tensioner system and a hydraulic tensioner arm to allow much higher spring rates if desired. The springs may be stacked in multiple configurations to provide different spring rates. Package space can be reduced depending on the number of springs and orientations of said springs within the tensioner arm.

19 Claims, 8 Drawing Sheets

(52) U.S. Cl.
CPC ............... *F16H 2007/0804* (2013.01); *F16H 2007/0806* (2013.01); *F16H 2007/0812* (2013.01); *F16H 2007/0855* (2013.01); *F16H 2007/0859* (2013.01); *F16H 2007/0872* (2013.01); *F16H 2007/0893* (2013.01); *F16H 2007/185* (2013.01)

(58) Field of Classification Search
CPC ........... F16H 2007/0812; F16H 7/0848; F16H 2007/0853; F16H 2007/0855; F16H 2007/0859; F16H 2007/0863; F16H 2007/0872; F16H 2007/0878; F16H 7/18; F16H 2007/185; F16H 2007/0891; F16H 2007/0893; F16H 2007/0895; F16H 2007/0897; F16H 7/0829; F16H 7/0834; F16H 7/0836; F16H 7/0838
USPC ........................................................ 474/111
See application file for complete search history.

(56) References Cited

U.S. PATENT DOCUMENTS

| | | | |
|---|---|---|---|
| 4,117,813 A | 10/1978 | Yamashita et al. | |
| 4,270,906 A * | 6/1981 | Kraft | F16H 7/1281 74/567 |
| 4,411,638 A | 10/1983 | Wilson | |
| 4,509,935 A * | 4/1985 | Foster | F16H 7/1236 188/290 |
| 4,557,707 A | 12/1985 | Thomey | |
| 4,573,952 A * | 3/1986 | Schulze | F16H 7/1254 474/133 |
| 4,767,383 A | 8/1988 | John | |
| 4,854,922 A * | 8/1989 | Hertrich | F16H 7/08 474/110 |
| 4,997,411 A | 3/1991 | Breon et al. | |
| 5,088,966 A * | 2/1992 | Suzuki | F16H 7/08 474/111 |
| 5,109,813 A | 5/1992 | Trzmiel et al. | |
| 5,248,282 A * | 9/1993 | Suzuki | F16H 7/0848 474/138 |
| 5,431,602 A | 7/1995 | Hendriks et al. | |
| 5,538,478 A | 7/1996 | Nakakubo et al. | |
| 5,606,941 A | 3/1997 | Trzmiel et al. | |
| 5,647,811 A * | 7/1997 | Mott | F16H 7/0848 474/111 |
| 5,657,725 A | 8/1997 | Butterfield et al. | |
| 5,700,216 A | 12/1997 | Simpson et al. | |
| 5,720,683 A | 2/1998 | Patton | |
| 5,868,638 A * | 2/1999 | Inoue | F16H 7/0848 474/140 |
| 5,908,363 A | 6/1999 | Suzuki | |
| 5,913,742 A | 6/1999 | Nakamura et al. | |
| 5,989,138 A * | 11/1999 | Capucci | F16H 7/18 474/140 |
| 5,993,342 A | 11/1999 | Wigsten et al. | |
| 6,117,033 A | 9/2000 | Simpson | |
| 6,146,300 A * | 11/2000 | Suzuki | F16H 7/08 474/111 |
| 6,193,623 B1 | 2/2001 | Koch et al. | |
| 6,196,939 B1 | 3/2001 | Simpson | |
| 6,205,965 B1 | 3/2001 | Stephan et al. | |
| 6,244,982 B1 | 6/2001 | Merelli | |
| 6,352,487 B1 | 3/2002 | Tada | |
| 6,383,103 B1 | 5/2002 | Fujimoto et al. | |
| 6,398,682 B1 | 6/2002 | Suzuki et al. | |
| 6,592,479 B2 | 7/2003 | Nakakubo et al. | |
| 6,609,985 B2 | 8/2003 | Todd et al. | |
| 6,609,987 B1 | 8/2003 | Beardmore | |
| 6,634,973 B1 | 10/2003 | Simpson et al. | |
| 6,716,124 B2 | 4/2004 | Markley | |
| 6,899,650 B2 | 5/2005 | Okuda et al. | |
| 6,945,889 B2 * | 9/2005 | Markley | F16H 7/0848 474/111 |
| 7,070,528 B2 | 7/2006 | Emizu et al. | |
| 7,189,175 B2 | 3/2007 | Maino et al. | |
| 7,654,924 B2 * | 2/2010 | Sato | F16H 7/0848 474/111 |
| 7,699,730 B2 | 4/2010 | Emizu et al. | |
| 8,197,369 B2 | 6/2012 | Mishima | |
| 8,535,187 B2 * | 9/2013 | Herbert | F01L 1/022 474/111 |
| 8,696,501 B2 * | 4/2014 | Ullein | F16H 7/08 474/111 |
| 9,683,637 B2 * | 6/2017 | Todd | F02B 67/06 |
| 10,077,825 B2 * | 9/2018 | Todd | F02B 67/06 |
| 2002/0022541 A1 | 2/2002 | Ullein et al. | |
| 2002/0065159 A1 * | 5/2002 | Markley | F16H 7/0848 474/110 |
| 2002/0160868 A1 | 10/2002 | Wigsten et al. | |
| 2002/0169042 A1 | 11/2002 | Kurohata et al. | |
| 2003/0070717 A1 | 4/2003 | Hashimoto et al. | |
| 2003/0171179 A1 | 9/2003 | Okuda et al. | |
| 2003/0216202 A1 | 11/2003 | Emizu et al. | |
| 2004/0029665 A1 * | 2/2004 | Yoshida | F16H 7/0848 474/110 |
| 2004/0067806 A1 * | 4/2004 | Markley | F16H 7/0848 474/111 |
| 2006/0063625 A1 | 3/2006 | Emizu et al. | |
| 2006/0100048 A1 * | 5/2006 | Wake | F16H 7/0831 474/140 |
| 2007/0142146 A1 | 6/2007 | Tryphonos | |
| 2007/0243961 A1 | 10/2007 | Aimone | |
| 2008/0015069 A1 | 1/2008 | Kroon et al. | |
| 2008/0064546 A1 | 3/2008 | Ullein | |
| 2009/0209378 A1 | 8/2009 | Kurematsu | |
| 2010/0093473 A1 | 4/2010 | Bulloch | |
| 2011/0015013 A1 | 1/2011 | Hofmann et al. | |
| 2011/0081997 A1 | 4/2011 | Markely | |
| 2012/0192821 A1 | 8/2012 | Herbert | |
| 2014/0106913 A1 * | 4/2014 | Adams | F16H 7/18 474/110 |
| 2014/0179471 A1 * | 6/2014 | Markley | F16H 7/0836 474/110 |
| 2015/0330482 A1 * | 11/2015 | Todd | F16H 7/0836 474/109 |
| 2016/0033016 A1 * | 2/2016 | Todd | F16H 7/0836 474/111 |
| 2017/0067545 A1 * | 3/2017 | Zeccara | F16H 7/18 |
| 2018/0195584 A1 * | 7/2018 | Park | F16H 7/08 |
| 2019/0063564 A1 * | 2/2019 | Artz | F16H 7/1281 |
| 2019/0234494 A1 * | 8/2019 | Cobb | F01L 1/022 |
| 2020/0370625 A1 * | 11/2020 | Cobb | F16H 7/08 |
| 2020/0400218 A1 * | 12/2020 | Freemantle | F16H 7/0848 |

FOREIGN PATENT DOCUMENTS

| | | |
|---|---|---|
| EP | 329855 B1 | 8/1989 |
| EP | 1001185 A1 | 5/2000 |
| EP | 1258655 A2 | 11/2002 |
| EP | 1302698 A1 | 4/2003 |
| EP | 1319868 A2 | 6/2003 |
| EP | 1323950 | 7/2003 |
| EP | 1621798 A2 | 1/2006 |
| EP | 1910710 A1 | 4/2008 |
| JP | 4126052 A | 11/1992 |
| JP | 9303506 | 11/1997 |
| JP | H10238603 A | 9/1998 |
| JP | 2000170855 A | 6/2000 |
| JP | 2001021013 A | 1/2001 |
| JP | 2001032897 A | 2/2001 |
| JP | 2002054700 A | 2/2002 |
| JP | 20020256916 | 9/2002 |
| JP | 2003027953 A | 1/2003 |
| JP | 2005098383 A | 4/2005 |
| JP | 2005282672 A | 10/2005 |
| JP | 2007211919 A | 8/2007 |
| JP | 2008303974 A | 12/2008 |
| KR | 19980060447 A | 10/1998 |
| KR | 20050055927 A | 6/2005 |
| KR | 1020090058301 A | 6/2009 |
| WO | 2007009631 A1 | 1/2007 |

(56) References Cited

FOREIGN PATENT DOCUMENTS

| WO | 2007091437 | A1 | 8/2007 |
|---|---|---|---|
| WO | 2009003825 | A1 | 1/2009 |
| WO | 2014138400 | A1 | 9/2014 |

OTHER PUBLICATIONS

International Search Report for PCT/US2012/053830; dated Feb. 25, 2013; 10 pgs.
International Search Report for PCT/US2013/071793; dated Mar. 4, 2014; 9 pgs.
International Search Report for PCT/US2013/072574 dated Mar. 20, 2014; 12 pages.
International Search Report for PCT/US2014/019329; dated Jun. 11, 2014; 13 pgs.
International Search Report for PCT/US2018/016096 dated Oct. 29, 2018.
International Search Report; PCT/JP2007/051326; dated Apr. 18, 2007, 9 pages.
International Search Report; PCT/US2010/048055; dated May 24, 2011, 9 pages.

\* cited by examiner

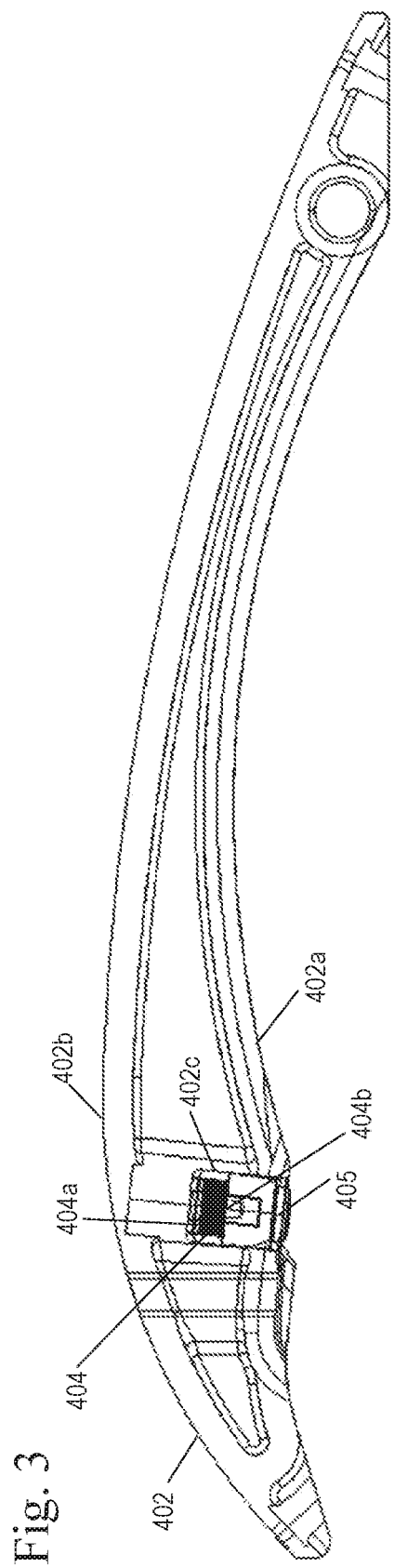

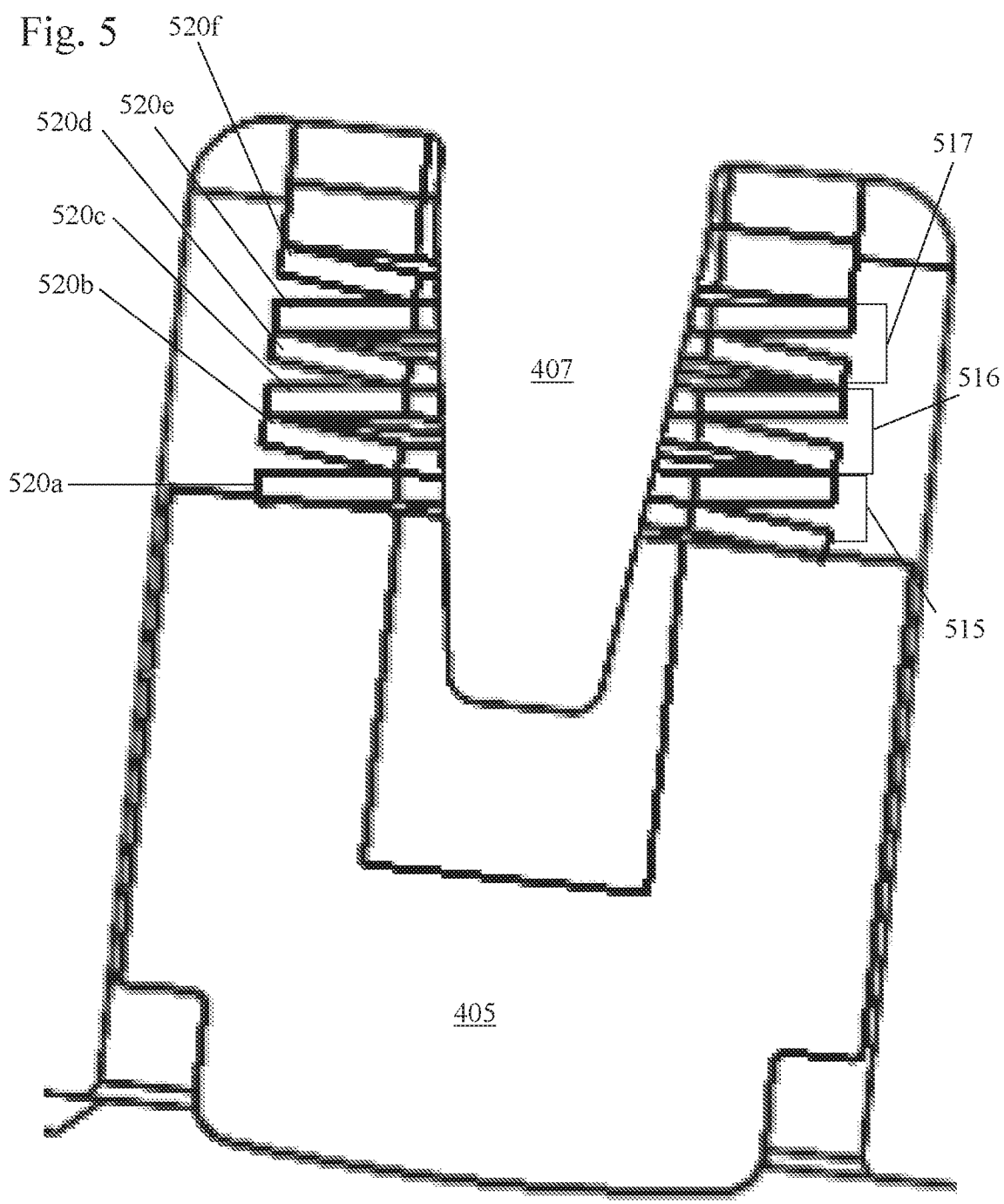

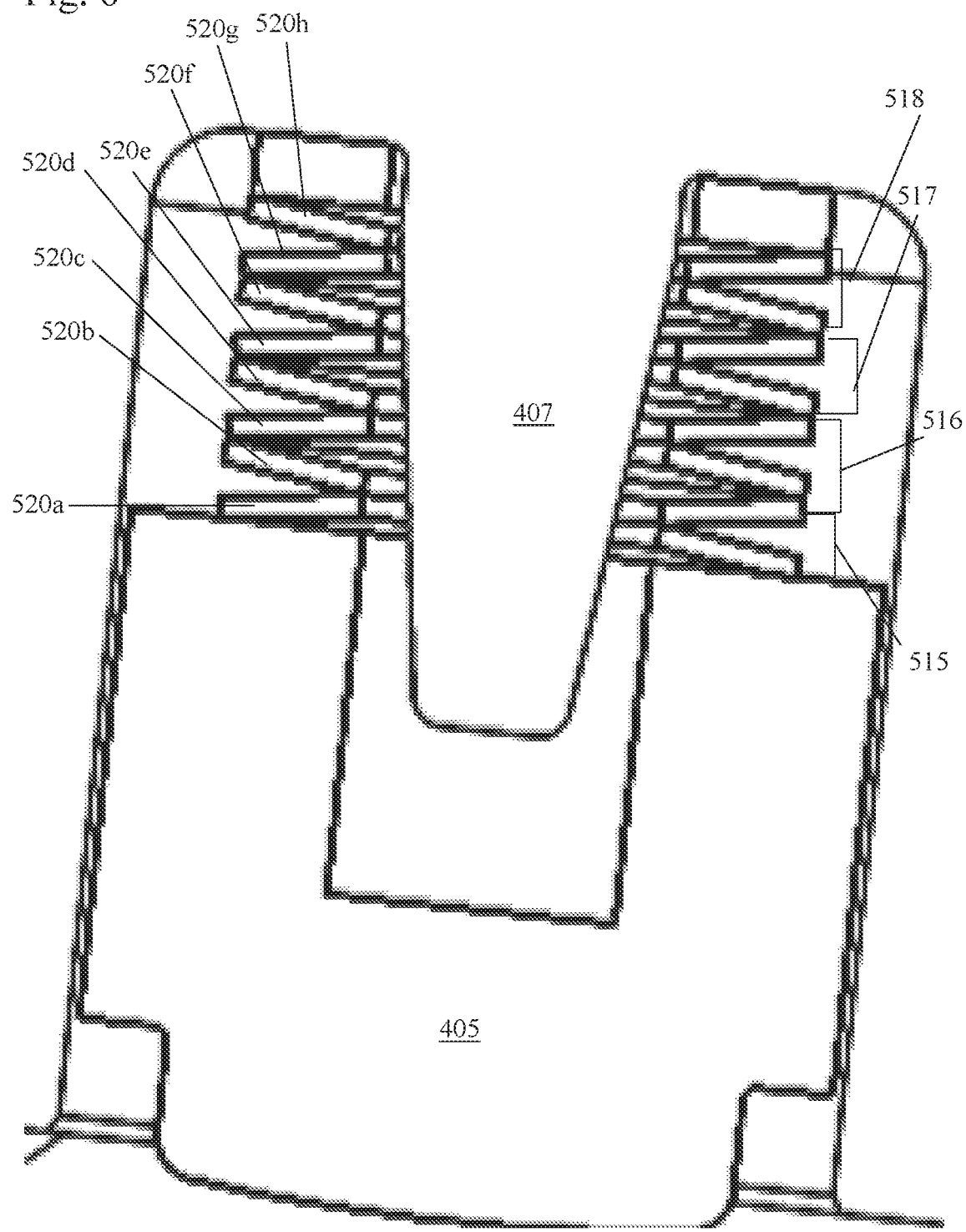

VARIABLE FORCE TENSIONER ARM WITH CAP DISK SPRING

BACKGROUND OF THE INVENTION

Field of the Invention

The invention pertains to the field of hydraulic tensioners. More particularly, the invention pertains to a dual hydraulic variable force tensioner with a variable force tensioner arm with a cap disk spring.

Description of Related Art

Dual hydraulic variable force tensioner systems utilize a tensioner arm containing a deep pocket next to a piston pad where a coil spring is retained via an arm button. A secondary piston of the dual hydraulic variable force tensioner contacts the arm cap via a piston and adjusts the spring force when additional mechanical force is required to control the chain drive system via the tensioner arm. The spring rate of the coil spring is significantly higher than the tensioner springs in the dual hydraulic variable force tensioner system to provide increased force with minimal secondary piston extension from the housing of the dual hydraulic variable force tensioner.

SUMMARY OF THE INVENTION

The present inventions places a stack of disk springs between a second piston of a dual hydraulic variable force tensioner system and a hydraulic tensioner arm to allow much higher spring rates if desired. The springs may be stacked in multiple configurations to provide different spring rates. Package space can be reduced depending on the number of springs and orientations of said springs within the tensioner arm.

BRIEF DESCRIPTION OF THE DRAWING

FIG. 2b shows a closeup of the cut through of the dual hydraulic variable force tensioner with a tensioner arm of FIG. 2a.

FIG. 3 shows a cut through of the tensioner arm.

FIG. 5 shows a tensioner arm with a Belleville spring set with a spring rate of 150 N/mm.

FIG. 6 shows a tensioner arm with a Belleville spring set with a spring rate of 100 N/mm.

DETAILED DESCRIPTION OF THE INVENTION

Figure 1:
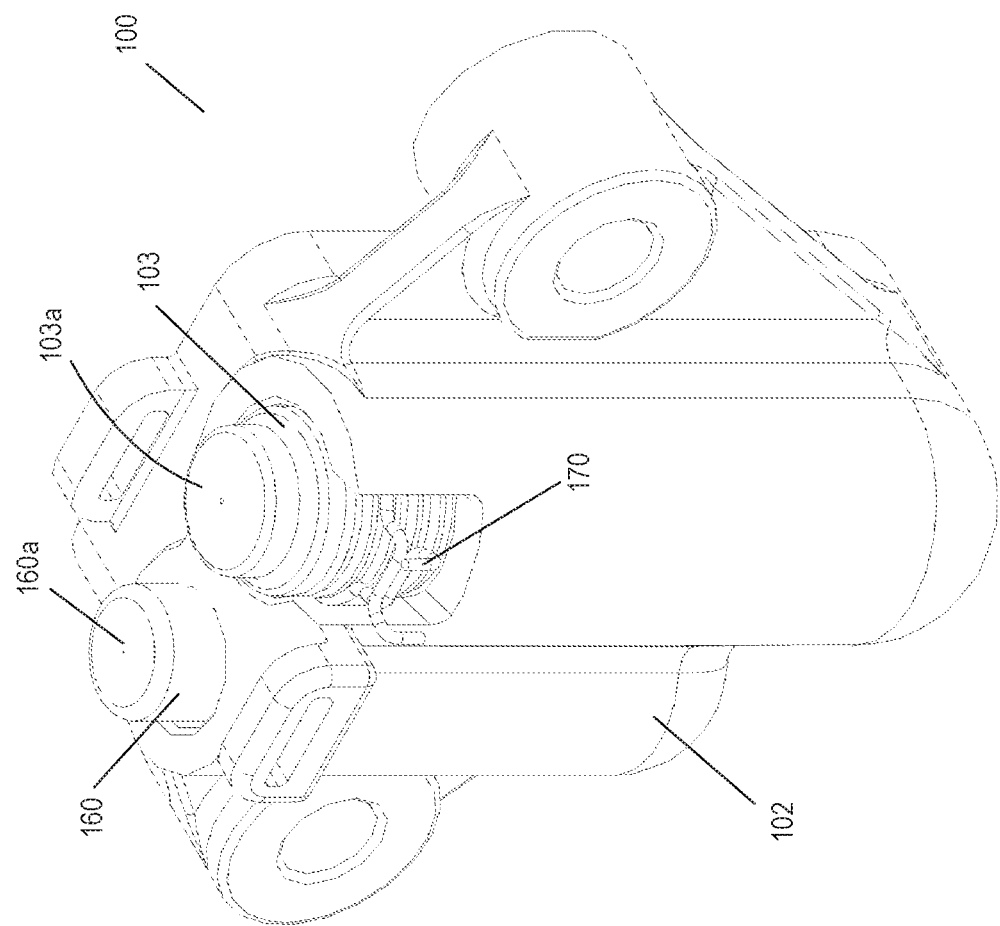
FIG. 1 shows a perspective view of dual hydraulic variable force tensioner.
Figure 2A:
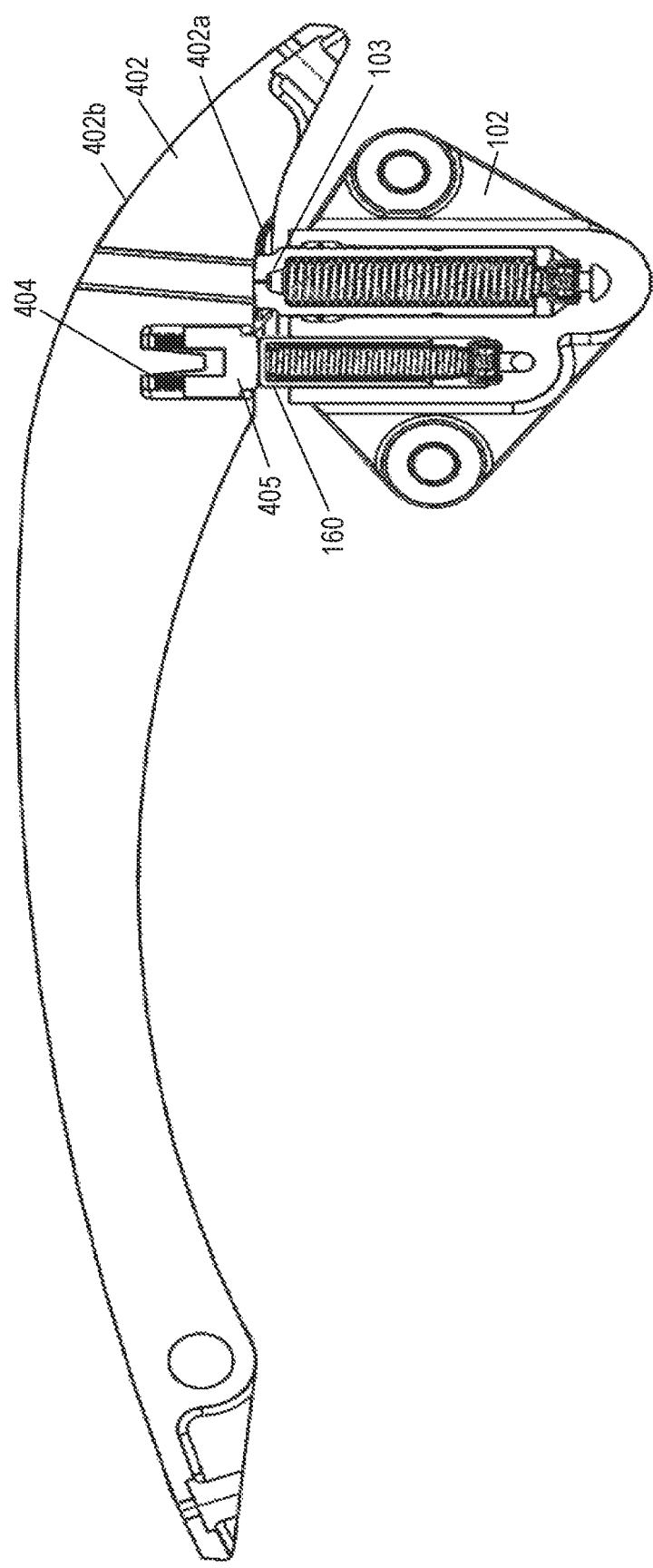
FIG. 2a shows a cut through of a dual hydraulic variable force tensioner with a tensioner arm.
Figure 2B:
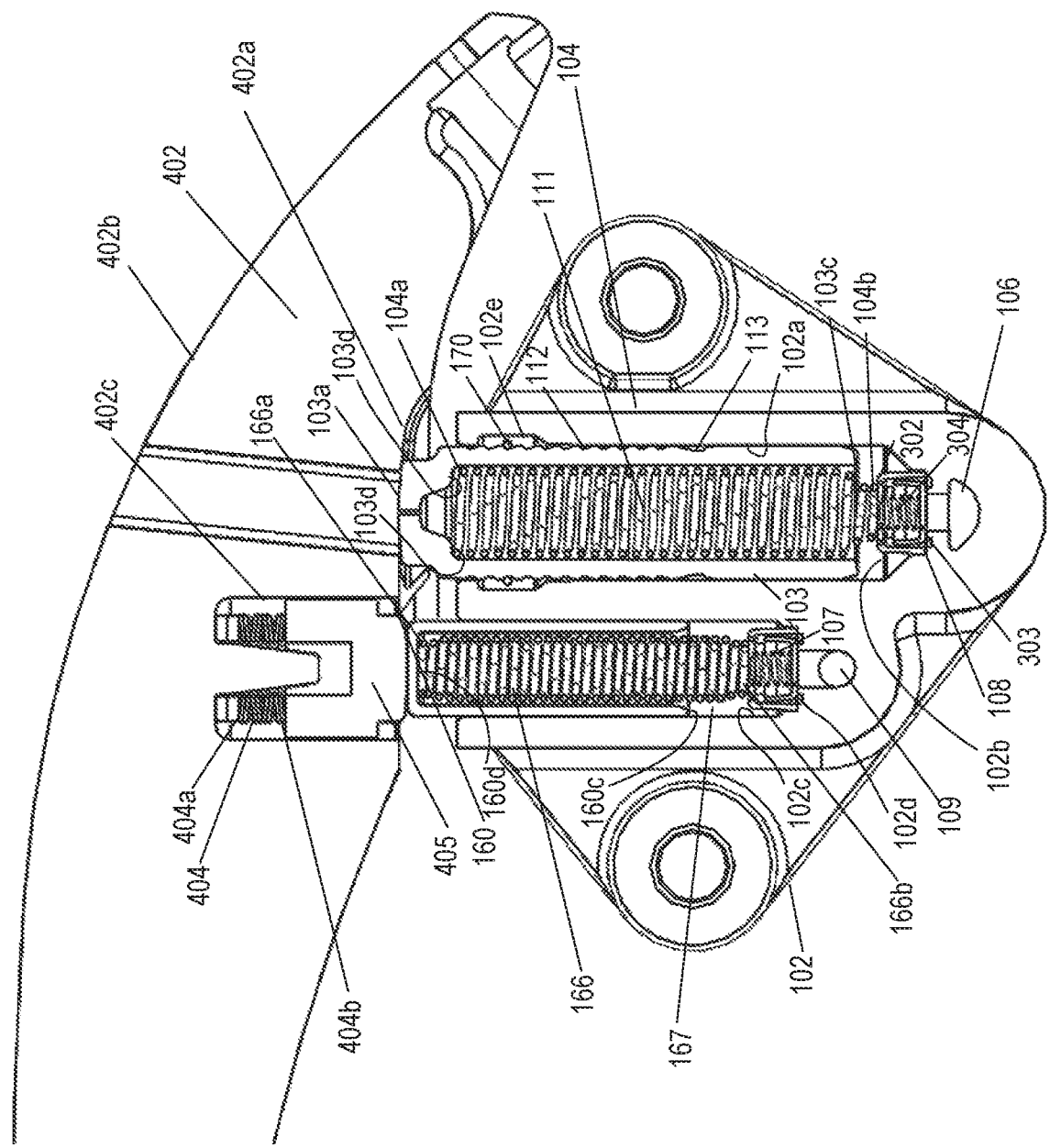

FIGS. 1-2b show a dual hydraulic variable force tensioner. The tensioner 100 tensions the chain or belt (not shown) through a tensioner arm or shoe 402. The tensioner arm 402 has a first sliding surface 402b in contact with the chain or belt and a second surface 402a opposite the first sliding surface 402b. Along the second surface 402b is a cavity 402c for receiving a spring 404 and a cap 405. The tensioner arm may additionally have an internal flange 407 within the cavity which passes through the spring 404 and centers the spring 404 within the cavity 402c. A first end 404a of the spring 404 is received by the closed end of the cavity in the tensioner arm 402 and the second end 404b of the spring 404 is received by a first surface 405a of the cap 405. The cap 405 is aligned with the first end 160a of the second piston 160 of the dual hydraulic variable force tensioner 100. A second surface 405b, opposite the first surface 405a contacts the second piston 160. Movement of the second piston 160 away from the housing 102 moves the cap 405, compressing the spring 404 and thus moving the tensioner arm 402 towards the chain or belt. While the cap 405 is shown as being U-shaped, any shape may be used that can capture a spring and contact an end of a piston.

The tensioner 100 includes a housing 102 having a first axially extending bore 102a parallel to a second axially extending bore 102c. Slidably received within the first axially extending bore 102a is a first piston 103. The first piston 103 has a body with a first end 103a, a second end 103c, an outer circumference 103d and a hollow interior 103b with a closed interior first end 103f. The outer circumference 103d has a series of ratchet grooves 112 along the length of the body, with a stop groove 113 near the second end 103c being a larger than the ratchet grooves 112 and capturing a ratchet clip 170. The ratchet clip 170 is an expandable clip that ratchets or expands and contracts in and out of the ratchet grooves 112 as the first piston 103 moves away from the housing 102. The ratchet clip 170 prevents the first piston 103 from moving towards the housing 102 when the tensioner arm or shoe 402 pushes on the first piston 103. The ratchet clip 170 is received within a groove 102e along the first axially extending bore 102a.

Present within the hollow interior 103b of the first piston 103 is a first piston spring 104. The first piston spring 104 has a first end 104a in contact with the closed interior first end 103f of the first piston 103 or a volume reducer and a second end 104b in contact with a bottom 102b of the first axially extending bore 102a of the housing 102. A first pressure chamber 111 is formed between the first piston 103 and the first axially extending bore 102a. Fluid is supplied to the first pressure chamber through a first supply 106 through an inlet check valve 108. The first piston 103 is biased outwards from the housing 102 to bias the chain through the first end 103a of the first piston, through the tensioner arm 402 by the force of the first piston spring 104 and the pressure of oil in the first pressure chamber 111.

The second axially extending bore 102c slidably receives a second piston 160. The second piston 160 has a body with a first end 160a, a second end 160c, and a hollow interior 160b with a closed first end 160d.

Present within the hollow interior 160b is a second piston spring 166 for biasing the second piston 160 outwards from the housing 102. The second piston spring 166 has a first end 166a in contact with the closed first end 160d of the interior 160b of the second piston 160 and a second end 166b in contact with the bottom 102d of the second axially extending bore 102c.

It should be noted that the second piston 160 may have an outer circumference with grooves and receive a ratchet clip and the first piston would have a smooth outer circumference.

A second high pressure chamber 167 is formed by the hollow interior 160b and the second axially extending bore 102c, within which is the second piston spring 166. Fluid is supplied to the second high pressure chamber 167 through an inlet supply 109 and preferably a check valve 107.

When the tensioner is tensioning a new chain or belt, during operation, fluid is supplied to the first pressure chamber 111 from the first inlet supply 106 and through an inlet check valve 108 and biases the first piston 103 outwards from the housing 102 in addition to the spring force of the first piston spring 104, as well as move the ratchet clip 170 within the ratchet grooves 112, biasing a span of the closed loop chain or belt through a tensioner arm 402. At the same time, the second piston 160 is also biased outwards from the second axially extending bore 102c by the second piston spring 166 and fluid supplied to the second pressure chamber 167 from the second inlet supply 109 and through inlet check valve 107 to bias a span of the closed loop chain or belt through the tensioner arm 402 via compression of the spring 404 through the cap 405 within the cavity 402c of the tensioner arm 402 through external spring 404. The inlet check valves 107, 108 may be formed of a retainer 302 containing a spring 304 biased cup 303.

When the tensioner is tensioning a worn chain or belt without high load, during operation, fluid is supplied to the first pressure chamber 111 through the first inlet supply 106 and through an inlet check valve 108 and biases the first piston 103 outwards from the housing 102 in addition to the spring force of the first piston spring 104, biasing a span of the closed loop chain or belt through the tensioner arm 402. At the same time, the second piston 260 is also biased outwards further through the second piston spring 266. Tension is also maintained by the spring biased cap 405 on the tensioner arm 402. As the chain or belt wears further, additional slack is present in the chain or belt span and the first piston 103 and second piston 160 would need to be extended further outwards from the housing 102 to bias and adequately tension the chain or belt.

When the tensioner is tensioning a chain or belt during high dynamic chain load, the high cyclic dynamic load force from the chain or belt alternately pushes the first piston 103 and the second piston 160 inwards towards the housing 102 and then outwards from the housing 102. Inward movement of the second piston 160 is resisted by fluid pressure in the second pressure chamber 167 created by check valve 107, and the second piston 160 moves outward by the force of spring 266. This causes the piston 160 to "pump up", drawing fluid through check valve 107 into the second pressure chamber 167 in the second bore 102c. This causes the first end 160a of the second piston 160 to exert an outward force on the tensioner arm 402 through the spring biased cap, opposing the inward force of the dynamic load.

When the dynamic chain or belt load decreases, fluid within the second pressure chamber 167 leaks to the engine through the second axially extending bore 102c or through a vent. This leakage reduces the mean pressure present within the second pressure chamber 167.

It should be noted that at all operating conditions, the pressure in the second pressure chamber 267 will pump up to maintain a minimum preload in the spring biased cap. When the force or preload in the spring 404 gets too low, the second piston 160 moves out from the housing 102, due to the second piston spring 166 and pressure in the second pressure chamber 167 and draws more oil in through the inlet check valve 107.

Therefore, the first piston 103 in the first axially extending bore 102a provides the dominant damping of the chain span or belt and the second piston 160 in the second axially extending bore 102c provides the dominant and automatically adjusting spring force through the external spring 161. The tensioner of the present invention automatically adjusts the mean tension force to keep the chain or belt tension as low as possible without sacrificing chain or belt control, significantly improving drive efficiency at new chain or belt conditions and conditions with dynamic loads.

During engine startup or engine failure pressure is not present in the second high pressure chamber 167 and the second piston 160 bottoms out or the second end 160c hits the bottom of the bore 102d and causes significant noise.

Figure 4:
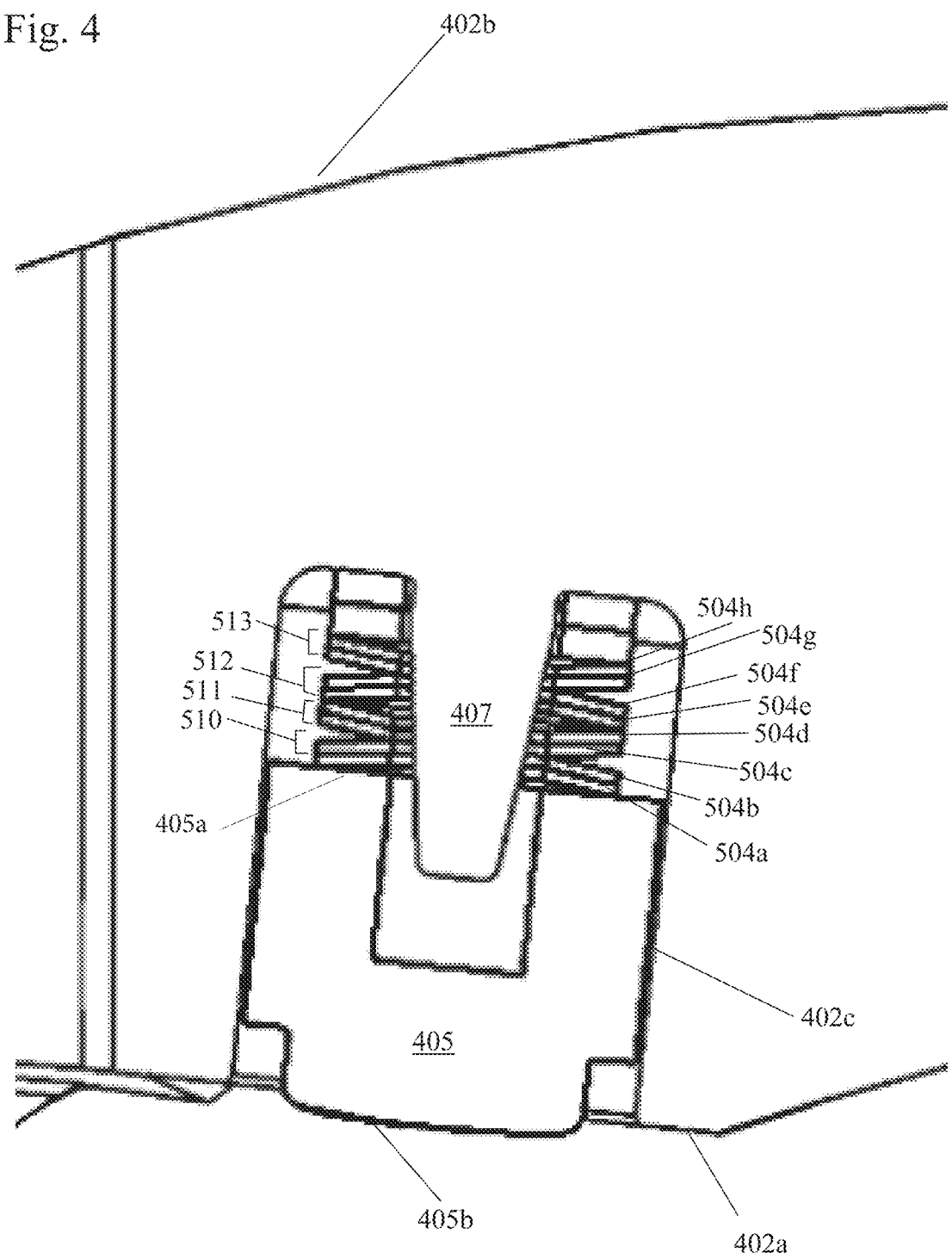
FIG. 4 shows a closeup along line 4-4 of FIG. 3 of the tensioner arm with a Belleville spring set with a spring rate of 400 N/mm.
Figure 7A:
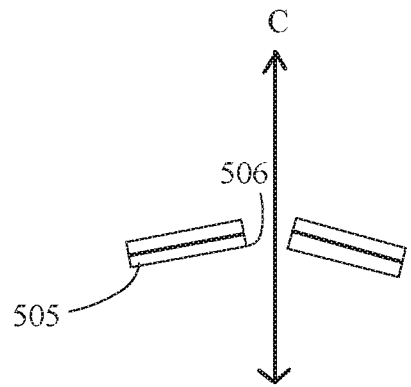
FIG. 7a shows a cut through of a Belleville spring in a first orientation.
Figure 7B:
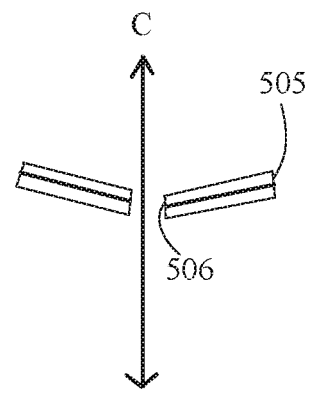
FIG. 7b shows a cut through of a Belleville spring in a second orientation.
Figure 7C:
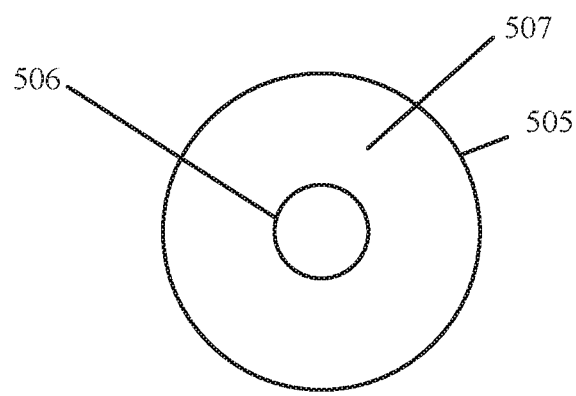
FIG. 7c shows a top view of a Belleville spring.

FIG. 4 shows a close-up of one arrangement of a spring 404 received between the cavity of the tensioner arm 402 and the cap 405. The spring 404 preferably surrounds an integral flange 407 of the tensioner arm 402. The spring 404 is preferably a plurality of Belleville spring or coned disc spring which may be grouped into sets. The Belleville spring is essentially shaped like a washer which is frusto-conical in shape and is a conical shell which can be loaded along its axis either statically or dynamically. The Belleville spring preferably has a center opening 506 and an outer circumference with an edge 505 as shown in FIG. 7c.

Multiple Belleville washers are preferably stacked to modify the spring constant (or spring rate) or the amount of deflection. Stacking individual springs or sets of springs in the same direction will add the spring constant in parallel (same orientation one on top of the other), creating a stiffer joint (with the same deflection). Stacking individual springs or sets of springs in an alternating direction (different orientation) is the same as adding common springs in series, resulting in a lower spring constant and greater deflection. Mixing and matching directions allow a specific spring constant and deflection capacity to be designed.

In FIG. 4, a tensioner arm with a spring rate of 400 N/mm biasing the cap 405 is shown. As shown, four sets of Belleville spring sets or cone shaped disk springs with each set 510, 511, 512, 513 comprising two springs are stacked in an alternating fashion (first orientation, second orientation, first orientation, second orientation, etc . . . ), with a first Belleville spring set 510 comprising two springs 504a, 504b, being stacked in a first orientation, a second Belleville spring set 511 comprising two springs 504c, 504d stacked in a second orientation, opposite the first orientation, a third Belleville spring set 512 comprising two springs 504e, 504f stacked in a first orientate on and a fourth Belleville spring set 513 comprising two springs 504g, 504h stacked in the second orientation. The sets of springs 510, 512 of the first orientation are oriented such that an edge 505 of the outer circumference of the springs extends below the center hole 506 of the spring relative to a central axis C as shown in FIG. 7a. The set of springs 511, 513 of the second orientation are oriented such that an edge 505 of the outer circumference of the springs extends above the center opening 506 of the spring relative to the central axis C as shown in FIG. 7b.

Therefore, as shown in FIG. 4, the area 507 surrounding the center openings 506 of the first set of Belleville springs 510 (first orientation) contacts the area 507 surrounding the center opening 506 of the second set of Belleville springs 511 (second orientation). The edges 505 of the outer circumference of the third set of Belleville springs 512 contacts the edges 505 of the outer circumference of the second set of Belleville springs 511 and the area 507 surrounding the center opening 506 of the third set of Belleville springs 512 contacts the area 507 surrounding the center opening 506 of the fourth set of Belleville springs 513. In this embodiment, the first set of Belleville springs 510 is adjacent the cap 405 and the fourth set of Belleville springs 513 is adjacent the body of the tensioner arm 402.

FIG. 5 shows a tensioner arm 402 with a spring rate of 150 N/mm biasing the cap 405. In this arrangement, three sets of Belleville or cone shaped disk springs with each set 515, 516, 517 comprising two springs which within the set are stacked in an alternating fashion (first orientation, second orientation, first orientation, second orientation, etc . . . ). The first Belleville spring set 515 comprising two springs 520*a*, 520*b*, being stacked in a first orientation and a second orientation within the set, a second Belleville spring set 516 comprising two springs 520*c*, 520*d* being stacked in a first orientation and a second orientation within the set, a third Belleville spring set 517 comprising two springs 520*e*, 520*f* being stacked in a first orientation and a second orientation within the set. In this embodiment, six individual springs are stacked in alternating orientations between the cap 405 and the body of the tensioner arm 402 within the bore 402*c*. As described above, in the first orientation, the spring is oriented such that an edge 505 of the outer circumference of the springs extends below the center hole 506 of the spring relative to a central axis C as shown in FIG. 7*a* and in the second orientation, the spring is oriented such that an edge 505 of the outer circumference of the springs extends above the center opening 506 of the spring relative to the central axis C as shown in FIG. 7*b*.

FIG. 6 shows a tensioner arm with a spring rate of 100 N/mm. In this arrangement, four sets of Belleville or cone shaped disk springs with each set 515, 516, 517, 518 comprising two springs which within the set are stacked in an alternating fashion (first orientation, second orientation, first orientation, second orientation, etc . . . ). The first Belleville spring set 515 comprising two springs 520*a*, 520*b*, being stacked in a first orientation and a second orientation within the set, a second Belleville spring set 516 comprising two springs 520*c*, 520*d* being stacked in a first orientation and a second orientation within the set, a third spring set 517 comprising two springs 520*e*, 520*f* being stacked in a first orientation and a second orientation within the set, and a fourth Belleville spring set 518 comprising two springs 520*g*, 520*h* being stacked in a first orientation and a second orientation within the set. In this embodiment, eight individual springs are stacked in alternating orientations between the cap 405 and the body of the tensioner arm 402 within the bore 402*c*. As described above, in the first orientation, the spring is oriented such that an edge 505 of the outer circumference of the springs extends below the center hole 506 of the spring relative to a central axis C as shown in FIG. 7*a* and in the second orientation, the spring is oriented such that an edge 505 of the outer circumference of the springs extends above the center opening 506 of the spring relative to the central axis C as shown in FIG. 7*b*.

Since the stiffness of the arm spring affects the dynamic load sharing between the primary and secondary pistons, the spring could additionally be adjusted to optimize damping from the primary piston.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A tensioner arm comprising:
    a body having a first surface for contacting a chain or belt and a second surface opposite the first surface, the second surface defining a cavity;
    a cap received within the body, the cap having a first end and a second end, the first end being opposite the second end, wherein the first end of the cap is present within the cavity of the body of the tensioner arm; and
    at least two spring sets, each spring set being oriented within the cavity between the first end of the cap and the body of the tensioner arm, wherein a first spring set of the at least two spring sets is oriented in a first direction between the first end of the cap and the cavity and a second spring set of the at least two spring sets is oriented in a second direction, opposite the first direction and the at least two spring sets bias the cap away from the body of the tensioner arm.

2. The tensioner arm of claim 1, further comprising a flange extending from the body within the cavity and received by the at least two spring sets.

3. The tensioner arm of claim 1, wherein each spring set of the at least two spring sets comprises two springs and the springs of each spring set are coned disc springs having an outer circumference with an edge surrounding a center.

4. The tensioner arm of claim 3, wherein the springs of each spring set are oriented in the same direction within the corresponding spring set.

5. The tensioner arm of claim 3, wherein the first spring set is oriented within the cavity in a first orientation such that the edge of the outer circumference of the springs of the first spring set lay adjacent to the cap and the second spring set is oriented within the cavity such that the center of the springs of the second spring set contacts the center of the springs of the first spring set in the first orientation.

6. The tensioner arm of claim 1, wherein the at least two spring sets combine to have a spring constant of between 150 N/mm to 400 N/mm.

7. The tensioner arm of claim 1, wherein the cap has a cap body in which the cap body and a first surface of the cap body of the cap is received within the cavity of the tensioner arm.

8. A tensioner arm comprising:
    a body having a first surface for contacting a chain or belt and a second surface opposite the first surface, the second surface defining a cavity;
    a cap received within the body, the cap having a first end and a second end, the first end being opposite the second end, wherein the first end of the cap is present within the cavity of the body of tensioner arm; and
    a plurality of spring sets stacked within the cavity between the first end of the cap and the body of the tensioner arm for biasing the cap away from the body of the tensioner arm, each spring set comprising a first spring and a second spring, wherein the first spring of each spring set is oriented in a first orientation and a second spring of each spring set is oriented in a second orientation, opposite the first orientation.

9. The tensioner arm of claim 8, further comprising a flange extending from the body within the cavity and received by the plurality of spring sets.

10. The tensioner arm of claim 8, wherein each spring of each spring set of the plurality of spring sets is a coned disc spring having an outer circumference with an edge surrounding a center.

11. The tensioner arm of claim 10, wherein in the cavity, the edge of the outer circumference of the first spring of a spring set contacts the cap and the edge of the outer circumference of the second spring of another spring set contacts the body of the tensioner arm.

12. The tensioner arm of claim 8, wherein in the cavity and between the cap and the body of the tensioner arm are three spring sets.

13. The tensioner arm of claim 8 wherein in the cavity and between the cap and the body of the tensioner arm are four spring sets.

14. The tensioner arm of claim 8, wherein the plurality of spring sets combine to have a spring constant of between 150 N/mm to 400 N/mm.

15. The tensioner arm of claim 8, wherein the cap has a cap body in which the cap body and a first surface of the cap body of the cap is received within the cavity of the tensioner arm.

16. A tensioning system for tensioning a belt or a chain comprising:
- a tensioner arm comprising:
  - a body having a first surface for contacting the chain or the belt and a second surface opposite the first surface, the second surface defining a cavity;
  - a cap received within the cavity of the body, the cap having a first end and a second end, the first end being opposite the second end, wherein the first end of the cap is present within the cavity of the body of the tensioner arm; and
  - at least two spring sets, each spring set being oriented within the cavity between the first end of the cap and the body of the tensioner arm, wherein at least one of the at least two spring sets is oriented in a first direction between the first end of the cap and the cavity and a second spring set of the at least two spring sets is oriented in a second direction, opposite the first direction and the at least two spring sets bias the cap away from the body of the tensioner arm,
- a tensioner comprising:
- a housing having a first axially extending bore with a first fluid input and a second axially extending bore with a second fluid input;
- a first piston slidably received by the first axially extending bore, forming a first pressure chamber, which is in fluid communication with the first fluid input, between the first piston and the first axially extending bore, the first piston comprising a first piston body having a first end and a second end;
- a first piston spring received within the first pressure chamber between the first piston and the first axially extending bore for biasing the first piston away from the housing;
- a second piston slidably received within the second axially extending bore, the second piston comprising a second piston body having:
  - an open end;
  - a closed end;
  - a bottom surface at the open end;
  - a top surface at the closed end;
  - an outer circumference; and
  - a hollow interior having an inner diameter;
- the second axially extending bore forming a second pressure chamber, that is defined between the inner diameter of the second piston body and the second axially extending bore, in fluid communication with the second fluid input through a check valve;
- a second piston spring in the second pressure chamber, the second piston spring having a first end in contact with the second piston and a second end in contact with a bottom of the second axially extending bore, biasing the second piston away from the housing;
- wherein the closed end of the second piston contacts the cap in the tensioner arm.

17. The tensioning system of claim 16, wherein the first piston body has an outer circumference comprising a series of grooves.

18. The tensioning system of claim 17, further comprising an expandable clip engaging the series of grooves on the outer circumference of the first piston body.

19. The tensioner system of claim 16, wherein the cap has a cap body in which the cap body and a first surface of the cap body of the cap is received within the cavity of the tensioner arm.

* * * * *